June 9, 1925.
W. F. BORN
COOKING APPLIANCE
Filed Nov. 30, 1923
1,541,472
2 Sheets-Sheet 1
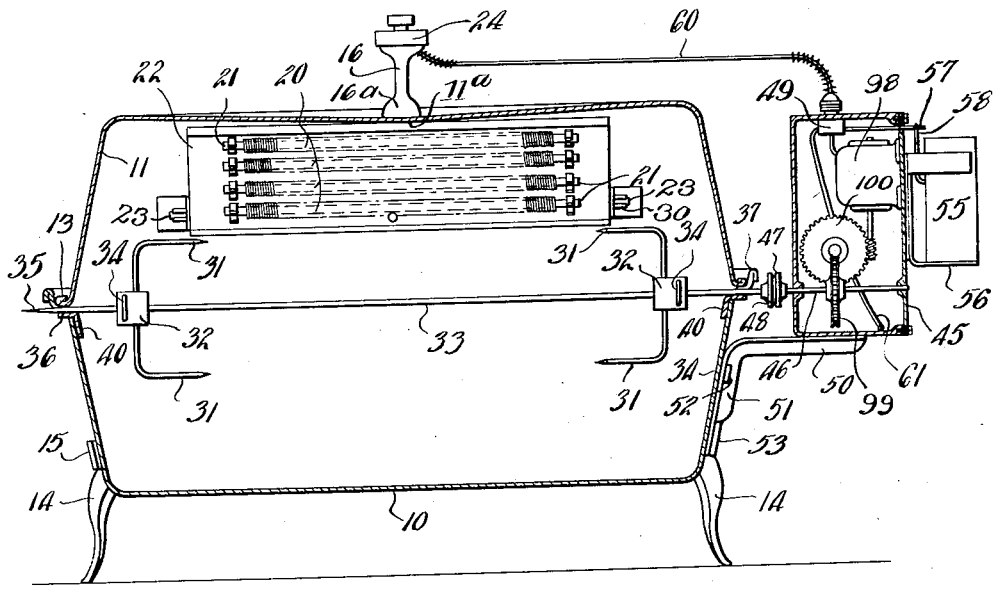
Fig.-3
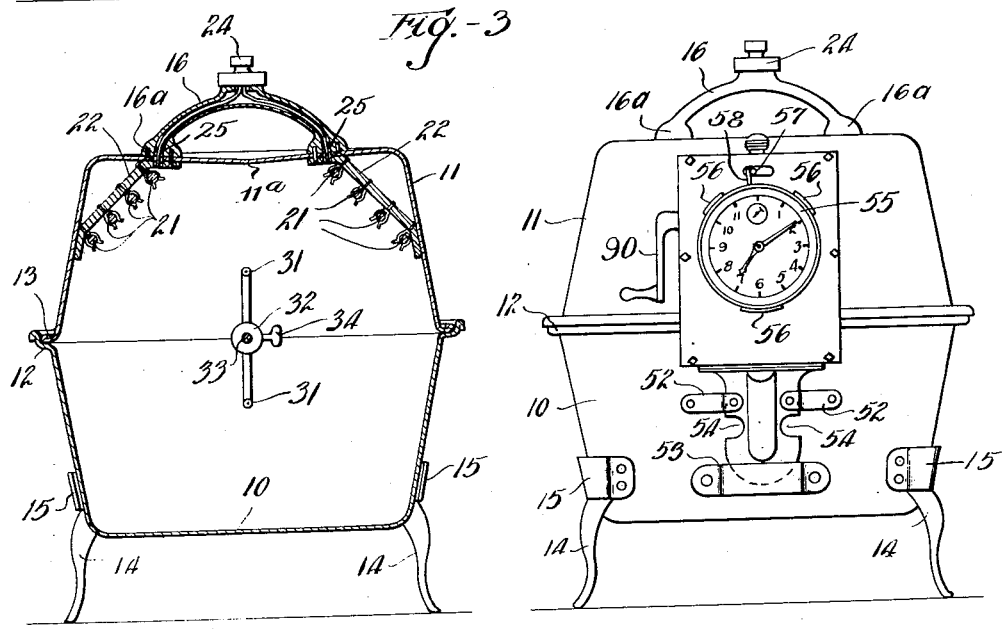
Fig.-2
Fig.-1
INVENTOR
William F. Born,
BY Bates Macklin
ATTYS.

June 9, 1925.
W. F. BORN
COOKING APPLIANCE
Filed Nov. 30, 1923
1,541,472
2 Sheets-Sheet 2
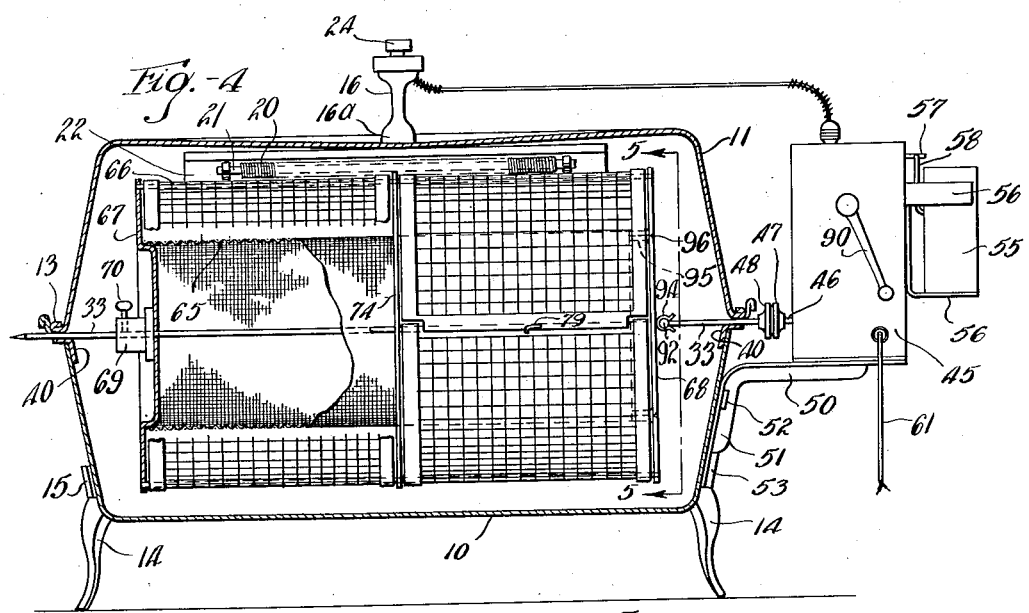
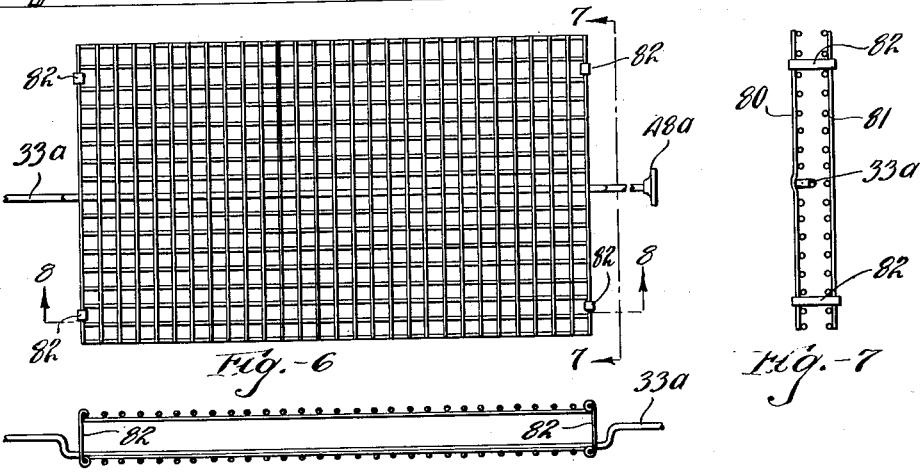
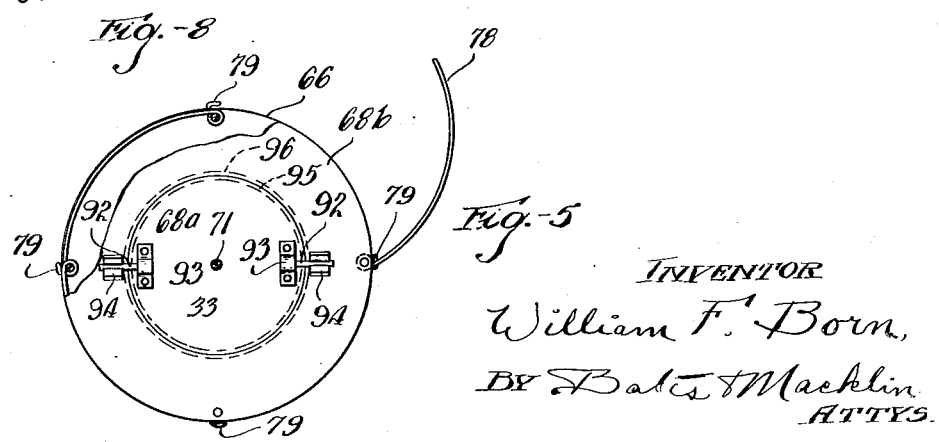
INVENTOR
William F. Born,
BY Bates & Macklin
ATTYS.

Patented June 9, 1925.

1,541,472

UNITED STATES PATENT OFFICE.

WILLIAM F. BORN, OF LAKEWOOD, OHIO.

COOKING APPLIANCE.

Application filed November 30, 1923. Serial No. 677,748.

*To all whom it may concern:*

Be it known that I, WILLIAM F. BORN, a citizen of the United States, residing at Lakewood, in the county of Cuyahoga and State of Ohio, have invented a certain new and useful Improvement in a Cooking Appliance, of which the following is a full, clear, and exact description, reference being had to the accompanying drawings.

This invention is concerned with electrical cooking apparatus and the general object is the provision of a compact, portable electrically heated cooking appliance of general utility for roasting, toasting, broiling and the combined broiling and steaming of a diversity of foods.

A more specific object of my invention is the provision of an electrically heated cooking apparatus comprising readily separable parts which are easily assembled in an obvious manner, whereby the device may be compactly stored when not in use and may be readily cleaned after using, and which when in use may completely enclose the food being prepared.

A further object of my invention is the provision of a cooking appliance in accordance with the foregoing objects and in addition thereto, the provision of a novel arrangement of heating elements and interchangeable food supporting mediums, which may be movable relative to the heating elements to effect a uniform application of heat to the food being prepared.

Other objects will hereinafter be set forth in the following description of the device illustrated in the accompanying drawings which show a preferred embodiment of my invention. The essential characteristics are summarized in the claims.

In the drawings Fig. 1 is an end elevation of a cooking appliance showing a time control mechanism and embodying the features of my invention; Fig. 2 is a cross-sectional elevation taken transversely of the appliance; Fig. 3 is a longitudinal cross-sectional elevation showing the relation of a movable food supporting or carrying means and heating elements enclosed in the appliance; Fig. 4 is a similar longitudinal cross-sectional elevation showing the device equipped with a different type of food carrying means which may be interchangeable with the food carrying means embodied in the appliance as shown in Fig. 3; Fig. 5 is an end elevation of the carrying means shown of Fig. 4. Fig. 6 is a plan view of a third food supporting or carrying means which may be also interchangeable with those disclosed in Figs. 3 and 4. Fig. 7 is an end elevational view of the food carrier shown in Fig. 6 while Fig. 8 is a side view of the same.

In carrying out the objects of my invention, I provide a cooking chamber formed by a pair of pan members positioned in inverted relations and which inclose a power driven spit or equivalent interchangeable food carrying means, which rotatably supports the food in juxtaposition with electrical heating coils positioned in one of the pan members. I also provide a mechanism controlled by a time clock which may be set to start rotation of the food carrier and to energize the heating coils at a predetermined time.

Accordingly in Fig. 2 I show a cooking chamber for the food which may be formed by a bottom member 10 similar to the usual open roast pan and a similar shaped top member 11. The bottom pan member is provided with a beaded flange portion 12 extending around the perimeter thereof which affords a rest for a flange 13 formed on the top pan member, whereby when the top pan member 11 is inverted and superposed upon the bottom pan member 10, the interior of the pan members is effectively sealed and comprises the cooking chamber. The top of the member 11 may be formed to provide a centrally disposed rib 11ª which, when the appliance is used for roasting serves as a condensate collector. The condensate may thus drip from the rib and baste the food being roasted. Leg members 14 are provided which are properly formed to removably engage the pan 10 in bracket members 15 secured to the four corners of the pan adjacent the bottom thereof. The legs may be of sufficient height to support the apparatus a suitable distance above the supporting surface. The top pan member 11 is provided with a handle 16 which may be secured to the top wall thereof at an intermediate position between the ends of the cooking apparatus.

The electrical heating elements are preferably carried by the top pan member 11 and may comprise a plurality of coils 20 wound upon any suitable supporting means such as porcelain tubes 21 suitably mounted upon heat deflecting and insulating panels 22 which are diagonally disposed across the corners of the top pan 11. The removable panels 22 are provided with projections 23 at the ends thereof which may engage suitable metallic spring brackets 30 rigidly secured to the inner surface of the side walls of the top pan 11.

The coils 20 may be connected to an electric cord in any suitable convenient manner, but I prefer, however, to incorporate a switch 24 in the handle 16. The handle 16 may accordingly be formed of hard rubber or other similar insulating material with the yoke portions thereof hollow to carry the wires to sockets formed in the attaching portions 16ª of the handle, whereby the handle may be attached by snapping the sockets onto spring contacts 25 which extend through openings in the top panel member 11 and are carried by the panels 22. These contacts are electrically connected with the heating coils 20. This arrangement affords a quick assembly of the panel members and coil and when it is desired to clean the top pan 11, they may be quickly removed from the pan member.

If desired, the switch 24 may be arranged to connect the groups of coils 20 in series or in multiple or one group of coils may be connected to the source of energy thus affording a range of heat regulations for different types of foods.

The food carrying means may comprise a variety of forms depending upon the type of food being prepared. The means shown in Fig. 3, for instance, being a spit particularly adaptable for roasting meat, fowl and the like. This device may comprise forks 31 suitably mounted on slide blocks 32 which are carried by a removable rotating spit rod 33. Any suitable means, such as binding screws 34, may be provided on the blocks 32 for securing the forks 31 in adjusted position on the spit rod 33. The rod 33 may be supported by the bottom pan member 10 and is pointed at one end 35 thereof to facilitate its insertion in meat and fowl and assembling of the rod in an opening indicated at 36, is facilitated by having this opening comprising a slot formed in an end flange portion of the bottom member. The opposite flanged end of the pan may be also suitably slotted, as indicated at 37, whereby the opposite end of the rod may be removed by simply lifting it out of the slot. It will thus be seen that when the top pan member 11 is superimposed upon the bottom pan member, the flange 13 thereof maintains the rod 33 in rotatable position. In mounting the food upon the rod, as for instance, a fowl or a roast, one set of forks 31 is removed from the rod 33, the pointed end of the rod 33 may then be passed through the center of the roast. The pair of forks 31 may then be brought together to engage the end portions of the roast or fowl. Reinforcing bearing pieces 40 may be provided on the end walls, if desired, to support the ends of the rod 33 and to prevent wear of the pan. This reinforcing arrangement would be particularly desirable, if for instance, the pans 10 and 11 were formed of aluminum.

Rotation of the rod 33 to carry the food past the heating coils 20 may be effected by a spring motor (not shown) or an electrically driven motor 98 positioned within a housing 45. An extension of the drive shaft 46 may be actuated by the motor through reduction gears 99 and 100 and may be provided with a coupling member 47 which detachably engages a similar coupling member 48 positioned on one end of the food supporting rod 33. The rod 33 may thus be driven at a suitable minimum speed, preferably approximating three revolutions per minute.

The casing 45 may be removably supported on the pan 10 by a bracket 50 having a depending arm 51 thereof in sliding engagement with a pair of retaining members 52 engaging the upper portion of the arm 51 and a bottom bracket member 53 engaging the end of the arm 51 of the bracket 50. The bracket 50 may comprise a stamping suitably ribbed to obtain a maximum strength for a minimum weight of metal, and as shown in Fig. 1 may have notches as indicated at 54, which, when the bracket is shifted upwardly, will permit the adjacent ends of the bracket members 52 to be disengaged from the arm and thereby permit the ready removal of the bracket and supported casing from the cooking appliance. Disconnection of the spit rod 33 would have previously been effected by disconnecting the coupling 47 when the motor and housing are thus being removed.

The motor may be controlled by a suitable switch which may be operated normally or by a time controlled mechanism. The time control mechanism may comprise a small clock mechanism as indicated at 55 and may be attached to the casing 45 by spring brackets 56 whereby the clock may be provided with a switch actuating member to automatically control the starting operation of the appliance at some definite predetermined time. I accordingly provide a switch 49 within the casing 45 having an outwardly projecting switch lever 57 which may be actuated by an arm 58, the latter being controlled by the clock mechanism to close the switch by acting on the lever. The switch 24 is connectd to the switch 49 by an electric cord 60 extending therebetween.

A lead cord 61 may serve to attach the switch within the casing to a base plug or a lamp socket as the case may be. The motor driving the food supporting member 33 in the case may be attached to the lead cord 61 through the switch 49 controlled by the arm 57. The energizing of the coils and the starting of the motor may thus be effected simultaneously.

When it is desired to roast granular or loose food such as coarse cereals, corn, peanuts, sausages, etc., the apparatus may be conveniently utilized for this purpose by the use of a cage, preferably cylindrical in form, such as is shown in Figs. 4 and 5. This cage may comprise an inner cylinder 65 and an outer cylinder 66 which may be formed of a fine mesh and a coarse mesh screen respectively. These screens may be mounted upon disc members 67 and 68 which are adapted to be positioned on the rotating rod 33. The disc member 67 may be provided with a hub portion 69 at the center thereof, which may be suitably bored to permit the passage of the rotatable rod 33 therethrough. A securing means such as a wing screw 70 may be provided on the hub 69 for rigidly attaching the cylinder to the rotatable member. The opposite end disc 68 may be suitably bored as indicated at 71, Fig. 5, to permit free passage of the rotating member 33 thereto.

If desired the disc member 68 may comprise two parts as shown in Fig. 5, the inner part 68$^a$ being formed in the nature of an end door whereby the inner cylindrical screen 65 may comprise a cage for roasting corn or similar cereals while the outside cylinder may be considerably coarser, so that meat, such as sausages, etc. may be roasted in the outer compartment between the two cylinders. The disc 68$^a$ may be attached to the outer annular ring 68$^b$ by radially extending pins 92 carried by brackets 93 secured to the outer face of the disc. Substantially U-shaped spring members 94 may be secured to the outer disc 68$^b$ to engage the pins 92. Proper engagement between the disk 68$^a$ and the annular ring 68$^b$ may be obtained by providing inwardly extending flanges 95 and 96 on the respective members.

The cylinder may be partitioned by an intermediate disc 74 to provide two annular compartments whereby different food may be simultaneously cooked or roasted. Arcuate doors 78 may be hingedly attached to the cylinder and comprise part of the cylinder wall. A suitable latch 79 serves to prevent opening of the door when the apparatus is in use.

When it is desired to broil flat foods such as steak, a grid, such as is shown in Figs. 6 to 8 inclusive, may be utilized, in which case the rotating rod 33 is replaced by an offset rod 33$^a$, which rod may carry a coupling member 48$^a$ similar to the coupling member 48. Spaced apart grid members 80 and 81 may be secured to the rotating rod 38$^a$ upon the offset portion thereof as shown in Fig. 8. End spacing members 82 serve to maintain the grid 80 and 81 in proper spaced apart relation. Two of the members 82 may be in the form of latches whereby one grid member may be swung open relative to the other to permit ready positioning of the food between these members. The device in Fig. 6 may also be utilized for toasting such as bread, etc., in which case the member 33$^a$ would not be rotated by the motor but one set of coils being used and the grid position being reversed manually.

In Fig. 4, the casing 45 is shown as being provided with an exteriorly disposed crank 90 which is adapted to wind a spring motor within the casing the latter driving the member 46 in place of the electric motor shown in Fig. 3. When using a spring motor, the switch lever 57 would be operated in the manner hereinbefore described by the actuating arm 58 of the clock 55 to connect the heating coils of the appliance with a source of current and would also function to release or start the spring motor.

If desired, the majority of the members comprising the apparatus may be formed of aluminum, thus facilitating the portability of the apparatus whereby it may be conveniently used about the home wherever electric sockets are available for attachment of the cord.

From the foregoing, it will be readily understood that the entire assembly of this cooking appliance is effected in a very simple manner. The parts may be easily separated to permit ready cleaning thereof, and to provide for packing or storing of the entire apparatus within a relatively small space. The power delivering means and automatic switch mechanisms may be combined in a small housing at one end of the appliance and may be readily removed from the cooking utensil proper. The ready interchangeability and adaptability of the various movable parts for rotating the food in cycles to uniformly expose it to the heating coils, all add to the convenience in the use and operation of the appliance for a wide range of cooking, roasting and baking purposes. It is evident, of course, that the apparatus may be used for baking purposes without using a movable food supporting means driven by a motor.

The preservation of the natural flavor and juiciness of the food being prepared may be retained during roasting, broiling, etc., by placing water in the bottom pan whereby steam will be generated. In this case, meat, for instance, may be browned during the preliminary stages of the roasting or cooking operation and burning is prevented by subsequent generation of steam which also facilitates the basting of the food being cooked by reason of the condensate dripping from the central portion of the top pan upon the food. The benefits of cooking food by a surrounding medium of steam is obvious and it will be readily understood that food prepared in my device may comprise different parts of the menu for vegetables and may be boiled in the lower pan while meats are being roasted in the upper portion of the device in a surrounding medium of steam.

I claim:

1. In combination, a pan, a cover therefor, electrical heat radiating means mounted on the cover and exposed to the interior thereof, means within the pan for supporting food to be cooked out of contact with the pan and means for rotating said last named means whereby the direct radiant heat from the radiating means is uniformly applied to the food.

2. In a device of the character described, the combination of a pan, a second pan superimposed on and in inverted relation to the first named pan to form a cooking chamber, electrical heat radiating elements disposed in intersecting pans and carried by the second named pan, rotatable means within the pan for supporting food to be cooked, and positive means for rotating said last named means, whereby the radiant heat from the coils may be uniformly applied to the food.

3. The combination of a pair of pans having flanges formed about the perimeters thereof, whereby one pan may be inverted and superimposed upon the other to form an enclosure, electrical heat radiating means carried by the top pan, a rotatable mechanism supported by a bearing formed at the meeting line of the two pans the bottom pan and disposed within said enclosure, said rotatable mechanism being adapted to rotatably carry food in juxtaposition to said electrical heat radiating means and power driven means connected to said rotatable mechanism and detachable therefrom by an endwise movement of said rotatable member and disposed exteriorly of the enclosure for driving said rotatable food supporting means.

4. In combination, a pan, a cover therefor, electrical heat radiating coils mounted on and individually movable from the cover, removable means within the pan for supporting food to be cooked out of contact with the pan and means mounted on the pan but detachable therefrom for rotating said last named means whereby all of said means may be detached from the pan when it is desired to clean the same.

5. In a device of the character described, the combination of a pan, a second pan in inverted relation to the first named pan to form a cooking chamber, electrical heat radiating coils removably carried by the second named pan, rotatable means within the pan for supporting food to be cooked, a motor for rotating said last named means and slidably removable brackets for supporting the motor on the pan.

6. The combination of a pair of interfitting pans, one inverted and superimposed upon the other to form a cooking enclosure, electrical heat radiating coils removably carried by one of the pans, a rotatable food carrying mechanism supported by the bottom pan, power driven means detachably coupled to said rotatable mechanism and means for controlling selectively the energization of the coils.

7. In a device of the character described, the combination of a pair of cooking pans, one being inverted and superimposed upon the other, whereby the perimeters may be brought into engagement and thereby form a cooking chamber, electrical heat radiating coils carried by one of said pans, a rotatable member adaptable for the supporting and rotating of food to be cooked, means disposed exteriorly of the pan members for rotating said member, means including a multiple plug for selectively controlling the energization of said heat radiating coils and a timing device for automatically starting said driving means and for causing energization of the heating coils at a predetermined time.

8. In combination, a pair of pans having flanges formed about the perimeters thereof whereby one pan may be inverted and superimposed upon the other with the flanges in engagement to provide a closed cooking chamber, heating coils carried by one of the pan members, a rotatable member adaptable for the supporting and rotating of food in juxtaposition with said heating coils, said rotatable member extending between and bearing against the flanges of the pans and a reduction gear mechanism and motor for rotating said member.

9. In a device of the character described, the combination of a pair of cooking pans inverted relatively to form a cooking chamber, electrical heating coils carried by one of said pans, a rotatable spit disposed in said chamber, a motor and gearing for rotating said member, a removable handle for one of the pans, switch means controlling said heating coils, said switch means being carried by the handle, a second switch motor and a device for automatically starting said motor and for connecting said heating coils by closing said last named switch at a predetermined time.

10. In combination, a cooking vessel comprising a pair of members flanged about the perimeters whereby one may be superimposed upon the other with the flanges in engagement to form a closed cooking chamber, electrically energized heat generating means carried by one of the members, rotatable spit for supporting and rotating food in juxtaposition to the heat generating means, a switch controlling said heating means removably carried by one of the pans for causing the latter to radiate various amounts of heat, a second switch, and a time controlled device for operating the last named switch.

11. In combination a cooking vessel comprising a pair of flanged bowl shaped members detachably joined at the flanges thereof and electrically energized heat generating unit carried by one of the members, means for removably supporting the unit on said member, electrical connecting means extending through openings formed in the member supporting said heating units, exteriorly disposed contact connector in engagement therewith, food supporting and rotating means disposed within the vessel, said means being removable, a power operated unit for driving said food, rotating means and pedestal means capable of being slidably detached for supporting the power unit on the vessel, whereby, when the various elements are detached from the vessel, it may be readily cleaned.

12. In an apparatus of the character described, the combination of a cooking vessel comprising a pan and a removable cover, rotatable food supporting means disposed within the vessel an electrical heating element removably supported within the vessel, exteriorly disposed power operated means for driving said food rotating and supporting means, the latter means comprising a unitary mechanism including a motor, a switch, and a timing device for operating the switch to energize the motor at a selected or predetermined time.

13. In an apparatus of the character described, the combination of a cooking vessel comprising a bottom pan and an inverted top pan forming a cover for the bottom pan, a plurality of electrical heating elements removably positioned in the top pan, a food carrier having a closed bearing disposed between the members comprising the vessel and adapted to rotate food past said heating elements and thereby cause the latter to radiate heat uniformly upon the food to be cooked, means for rotating the latter and electrical switch means for varying the electrical connection of said heating elements, whereby they may be connected in multiple or parallel or singly to a source of energy.

14. In an apparatus of the character described, the combination of a pair of separable members comprising a cooking vessel, electrical heating coils removably carried by one of the members, a food supporting member rotatably mounted within the vessel adapted to carry the food in juxtaposition with said coils, a power unit, a support therefor removably attached to the vessel, detachable coupling connecting the food rotating member to the power unit and a slidably removable supporting pedestal for the power unit and a combined switch and handle also removably attached to the vessel whereby all of said removable elements may be disconnected from the cooking vessel when it is desired to clean the latter.

15. In combination a cooking vessel comprising a pair of separable members, an electrically energized heat generating unit carried by one of the members, means for removably supporting the unit on said member, electrical connecting means extending through openings formed in the member supporting said heating units, a handle for the cooking vessel, a contact connector associated with the handle, and a multiple switch carried by the handle whereby the coils of said heating unit may be connected singly, in series or in multiple by setting said switch.

16. In an apparatus of the character described, the combination of a cooking vessel comprising a bottom pan and an inverted top pan forming a cover for the bottom pan, electrical heating coils positioned in the top pan, a food carrier disposed between the members comprising the vessel and adapted to rotate food past said heating coils and thereby cause the latter to radiate heat uniformly upon the food to be cooked, a motor for rotating the latter, electrical switch means removably carried by the top pan for varying the electrical connection of said heating coils whereby they may be connected in multiple or parallel or singly to a source of energy and a time controlled switch for simultaneously connecting the heating coils and the motor to a source of energy.

17. In combination, a pan, a cover therefor, electrical heat radiating means mounted on the cover at either side thereof, means within the pan for supporting food to be cooked out of contact with the pan, a motor for rotating said last named means whereby the radiant heat from the coils may be uniformly applied to the food being prepared, a manually operated switch for connecting the coils to a source of energy, a second switch controlling a line to the manually operated switch and to the motor, means for operating said last named switch and a clock mechanism for operating said last named means at a predetermined time.

18. In a device of the character described, the combination of a pan, a second pan superimposed upon and in inverted relation to the first named pan to form a cooking chamber, separately removable electrical heat radiating coil carried by the second named pan, and exposed to the interior thereof, rotatable means within the pan for supporting food to be cooked, and positive means for rotating said last named means, whereby the radiant heat from the coil may be directly and uniformly applied to the food.

19. In combination, a pan, a cover therefor, electrical heat radiating means mounted within the cover, rotatable means within the pan for supporting food to be cooked out of contact with the pan, and power means including a shaft, a gearing and a motor for rotating the shaft at a slow speed, and means including a pair of connecting members, one mounted on the food supporting member and the other on said shaft, one being provided with openings and the other with pins occupying the openings for effecting a removable connection between the motor and said rotating means.

20. In combination, a pan, a cover therefor, electrical heat radiating means mounted within the cover on either side thereof, means within the pan for supporting food to be cooked out of contact with the pan, means for rotating said last named means whereby the radiant heat from the radiating means is uniformly applied to food, and a depression in said cover located in a vertical plane in common with the axis of rotation of said food supporting means, whereby vapor condensing on said cover may baste the food.

21. In combination, a pan, a second pan superimposed on and in inverted relation to the first pan to form a cooking chamber, an electrical heating element disposed in one of the pans, rotatable means within the pan for supporting food to be cooked, said rotating means, including a hollow cylinder mounted on an axle, and a second smaller cylinder within the first named cylinder whereby the food is maintained in close relation to the heating element.

22. A cooker comprising in combination a pan, a cover therefor, to form a cooking vessel, electrical heat radiating means within the vessel and a pair of substantially flat grill members for holding food between them, and rotating means carrying said grill members and projecting through the pan for rotating the grill members, a connection capable of being detached by an endwise movement of the grill when the cover is removed, and power means coupled to the rotating means by said connection for turning said supporting means.

In testimony whereof, I hereunto affix my signature.

WILLIAM F. BORN.